US008572366B1

(12) United States Patent
Yadav

(10) Patent No.: US 8,572,366 B1
(45) Date of Patent: Oct. 29, 2013

(54) AUTHENTICATING CLIENTS

(75) Inventor: Navindra Yadav, Cupertino, CA (US)

(73) Assignee: Google Inc.

( * ) Notice: Subject to any disclaimer, the term of this patent is extended or adjusted under 35 U.S.C. 154(b) by 1 day.

(21) Appl. No.: 13/474,876

(22) Filed: May 18, 2012

(51) Int. Cl.
*H04L 12/22* (2006.01)
*H04L 12/28* (2006.01)

(52) U.S. Cl.
USPC .......................................... 713/154; 713/162

(58) Field of Classification Search
None
See application file for complete search history.

(56) References Cited

U.S. PATENT DOCUMENTS

| | | | | |
|---|---|---|---|---|
| 6,654,796 | B1 * | 11/2003 | Slater et al. | 709/220 |
| 7,596,693 | B1 * | 9/2009 | Caves et al. | 713/161 |
| 2008/0052773 | A1 * | 2/2008 | Samprathi et al. | 726/13 |
| 2012/0117615 | A1 * | 5/2012 | MacKinnon et al. | 726/1 |

OTHER PUBLICATIONS

A new method to detect abnormal IP address on DHCP. Chiang et al. Journal of Networks, vol. 4. No. 6. Aug. 2009.*
A source address validation architecture testbed and deployment experience. Wu et al. Ip.com. Jun. 26, 2008.*

* cited by examiner

*Primary Examiner* — Venkat Perungavoor
(74) *Attorney, Agent, or Firm* — Honigman Miller Schwartz and Cohn LLP

(57) ABSTRACT

This disclosure provides a system and method for client authentication that allows a service provider to implement multiple authentication challenges to verify a user/client. The system includes an extractor, a comparer, and an attributer. The extractor receives an Internet protocol source address from a client and extracts a media access control address. The extractor also determines a source identifier of the client from the media access control address. The comparer compares the extracted media access control address with a client media access control address associated with the client, and signals execution of one or more client authentication challenges when the extracted media access control address fails to match the at least one client media access control address associated with the client. The attributer associates the source identifier with the client after successful execution of a client authentication challenge.

24 Claims, 6 Drawing Sheets

AUTHENTICATING CLIENTS

TECHNICAL FIELD

This disclosure relates to client authentication.

BACKGROUND

In general, information security entails protecting information from heft, loss, and corruption. Internet service providers may implement procedures to prevent phishing attacks and comprised user accounts. Attackers may use social engineering attacks on website users through simple phishing and sophisticated spear phishing attacks. Key stroke logging programs may record a user's login information, leading to a compromised user account. A service provider may implement multiple authentication challenges to verify a user. These authentication challenges may include multiple questions, cookies, etc.

SUMMARY

One aspect of the disclosure provides a method of client authentication that includes providing one or more authentication signals based on a client's source Internet protocol (IP) address to improve a client's experience by challenging the client with multiple levels of authentication only after receiving a signal indicating a possible attack or compromised account. The method includes receiving an Internet protocol source address of a client, extracting a media access control address from the Internet protocol source address, comparing the extracted media access control address with at least one client media access control address associated with the client, and signaling execution of one or more client authentication challenges when the extracted media access control address fails to match the at least one client media access control address associated with the client.

Implementations of the disclosure may include one or more of the following features. In some implementations, the method includes extracting an interface identifier from the Internet protocol source address and extracting the media access control address from the interface identifier. The Internet protocol source address may be an IPv6 address. In some examples, the method includes associating the extracted media access control address with the client after successful execution of the one or more client authentication challenges. Moreover, an age can be attributed to the extracted media access control address, such that the method may include disassociating the extracted media access control address from the client after a threshold period of time (e.g., an age of 2-6 months).

In some implementations, the method includes extracting an organizationally unique identifier from the media access control address. A source identifier can be determined from the organizationally unique identifier. The source identifier may include at least one of an entity identity, a source device type, or a source device unique identifier. The method may include comparing the determined source identifier with at least one source identifier associated with the client and signaling execution of one or more client authentication challenges when the determined source identifier fails to match the at least one source identifier associated with the client. The method may include associating the determined source identifier with the client after successful execution of the one or more client authentication challenges. Moreover, the determined source identifier can be disassociated from the client after a threshold period of time.

The method, in some implementations, includes determining a source device type and a source software application type from the media access control address and then comparing a compatibility between the determined source device type and the determined source software application type. The method may include signaling execution of one or more client authentication challenges when the determined source device type is incompatible with the determined source software application type.

Another aspect of the disclosure provides a security system that includes an extractor and a comparer. The extractor receives an Internet protocol source address of a client and extracts a media access control address from the Internet protocol source address. The comparer compares the extracted media access control address with at least one client media access control address associated with the client and signals execution of one or more client authentication challenges when the extracted media access control address fails to match the at least one client media access control address associated with the client.

In some implementations, the extractor extracts an interface identifier from the Internet protocol source address and extracts the media access control address from the interface identifier. The Internet protocol source address may be an address.

The security system may include an attributer that associates the extracted media access control address with the client after successful execution of the one or more client authentication challenges. The attributer may disassociate the extracted media access control address from the client after a threshold period of time.

In some implementations, the extractor extracts an organizationally unique identifier from the media access control address and may determine a source identifier from the organizationally unique identifier. The source identifier may include at least one of an entity identity, a source device type, or a source device unique identifier. The comparer may compare the determined source identifier with at least one source identifier associated with the client and signal execution of one or more client authentication challenges when the determined source identifier fails to match the at least one source identifier associated with the client. In some examples, the security system includes an attributer that associates the determined source identifier with the client after successful execution of the one or more client authentication challenges. Moreover, the attributer may disassociate the determined source identifier from the client after a threshold period of time.

The extractor may determine a source device type and a source software application type from the media access control address. The comparer may compare a compatibility between the determined source device type and the determined source software application type and signal execution of one or more client authentication challenges when the determined source device type is incompatible with the determined source software application type.

Yet another aspect of the disclosure provides a computer program product encoded on a computer readable storage medium comprising instructions that when executed by a data processing apparatus cause the data processing apparatus to perform operations. The operations include receiving an Internet protocol source address of a client, extracting a media access control address from the Internet protocol source address, comparing the extracted media access control address with at least one client media access control address associated with the client, and signaling execution of one or more client authentication challenges when the extracted media access control address fails to match the at least one client media access control address associated with the client.

In some implementations, the operations include extracting an interface identifier from the Internet protocol source address and extracting the media access control address from the interface identifier. The Internet protocol source address may be an IPv6 address. In some examples, the operations include associating the extracted media access control address with the client after successful execution of the one or more client authentication challenges. Moreover, an age can be attributed to the extracted media access control address, such that the method may include disassociating the extracted media access control address from the client after a threshold period of time (e.g., an age of 2-6 months).

In some implementations, the operations include extracting an organizationally unique identifier from the media access control address. A source identifier can be determined from the organizationally unique identifier. The source identifier may include at least one of an entity identity, a source device type, or a source device unique identifier. The operations may include comparing the determined source identifier with at least one source identifier associated with the client and signaling execution of one or more client authentication challenges when the determined source identifier fails to match the at least one source identifier associated with the client. The operations may include associating the determined source identifier with the client after successful execution of the one or more client authentication challenges. Moreover, the determined source identifier can be disassociated from the client after a threshold period of time.

The operations, in some implementations, include determining a source device type and a source software application type from the media access control address and then comparing a compatibility between the determined source device type and the determined source software application type. The operations may include signaling execution of one or more client authentication challenges when the determined source device type is incompatible with the determined source software application type.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A service provider may challenge a client's authentication multiple times (e.g., via questions, passwords, keys, etc.) to prevent unauthorized access to information or a service. The client experience may diminish, however, when the service provider uses multiple client authentication challenges every time the client attempts to access the information or service. Instead, the service provider may enhance the client's experience by executing multiple client authentication challenges only after receiving authentication signals based on the client's Internet protocol address (e.g., an IPv6 address). The authentication signals can provide an indication of likelihood of whether an attacker is using packet header forgery or Internet protocol address spoof to gain unauthorized access to information or services.

Figure 1:
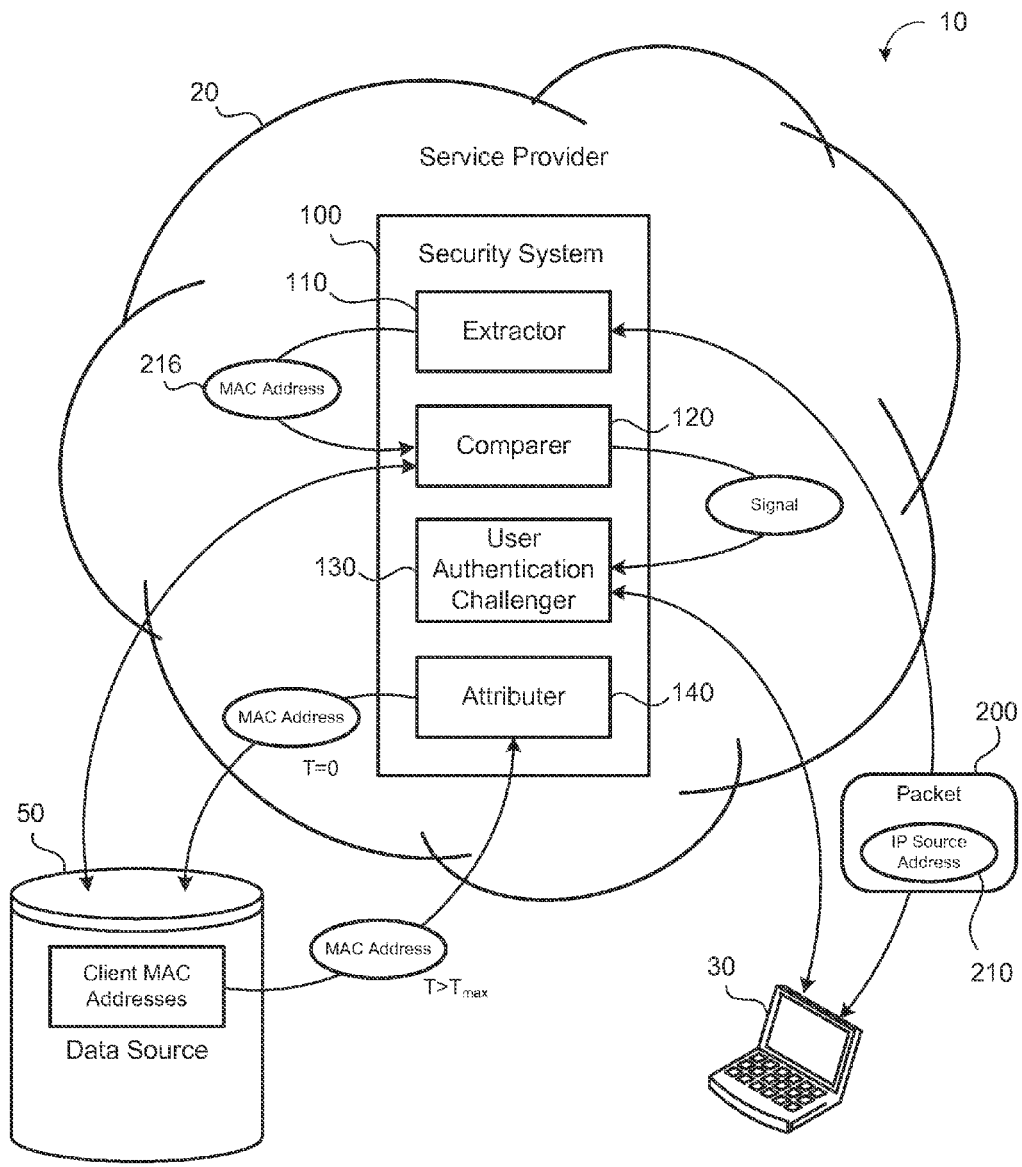
FIG. 1 is a schematic view of an exemplary network system.
Figure 2A:
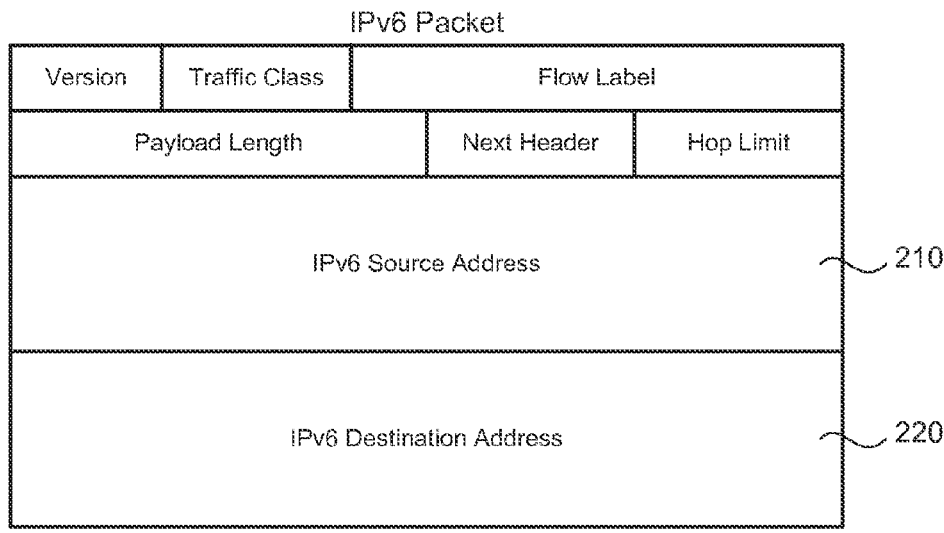
FIG. 2A is a schematic view of an exemplary IPv6 data packet.
Figure 2B:
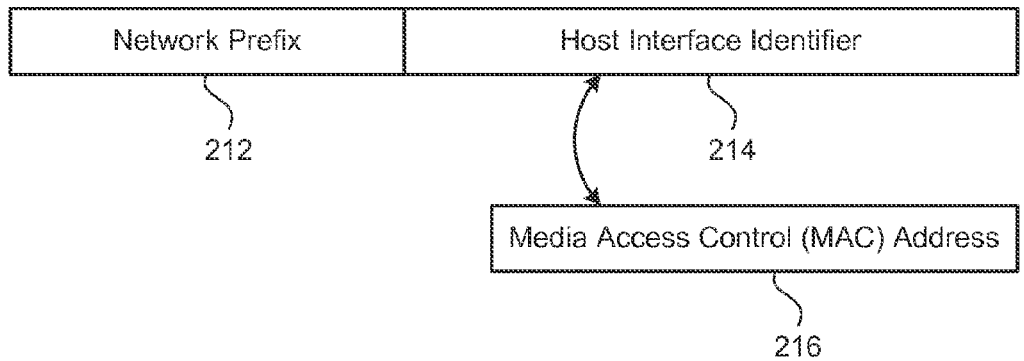
FIG. 2B is a schematic view of an exemplary Internet protocol address.
Figure 2C:
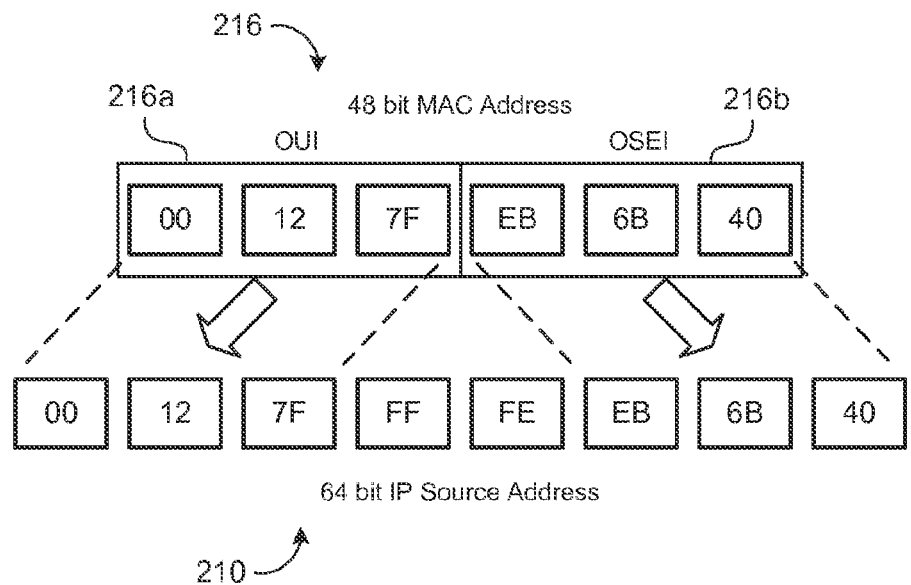
FIGS. 2C and 2D are schematic views of an exemplary 48 bit media control access (MAC) address being convertible to an EUI-64 address.
Figure 2D:
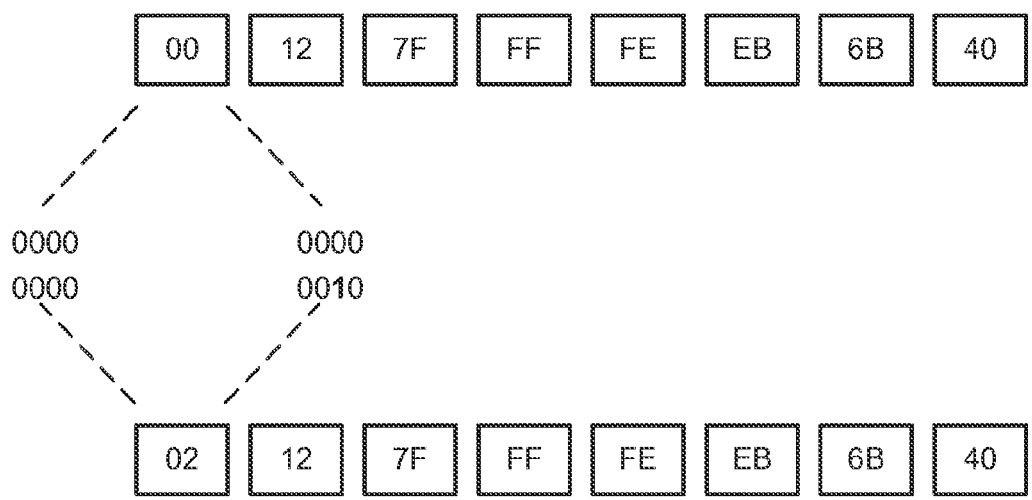
Figure 3:
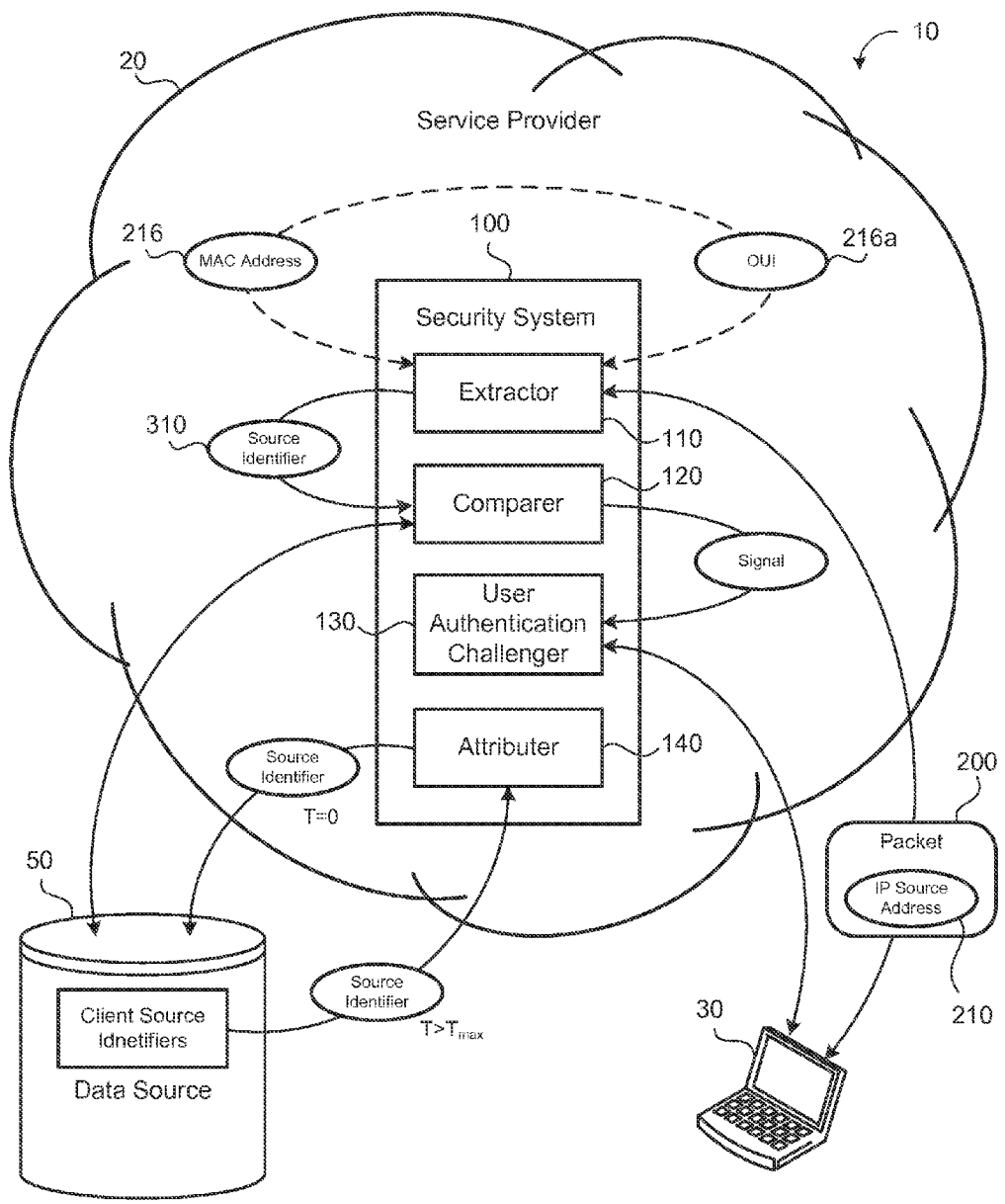
FIG. 3 is a schematic view of an exemplary network system.

Referring to FIGS. 1-3, in some implementations, a network system 10 includes a service provider 20 in communication with a client 30. The service provider 20 includes a security system 100 that receives a data packet 200 from the client 30. Referring to FIG. 2A, an IPv6 packet 200 is 128 bits long and has two parts: a header and payload. The header generally occupies the first 40 octets (320 bits) of the IPv6 packet and contains a source address 210, a destination address 220, and other attributes such as traffic classification options, a hop counter, and a next header pointing to the next element in the chain of headers, if any. Extension headers carry options that can be used for special treatment of a packet in the network, e.g., for routing, fragmentation, and for security using the IPsec framework.

The source address 2110 is the address of the machine that sent the packet 200, whereas the destination address 220 is the address of the machine or set of destination machines to which the frame has been sent. As shown in FIG. 2B, the source address 210 is a unicast IP address having two parts: a network prefix 212 and a host interface identifier 214. Malicious activity can be detected using the host interface identifier 214, which consists of the 64 least significant bits of a 128 bit IPv6 source address 210, when the host interface identifier 214 of the IPv6 address is automatically generated from a MAC address 216 of a network interface.

Ethernet and Wireless interfaces are generally assigned a Media Access Control (MAC) address 216, which are 48 bits wide. The MAC address 216 is a unique identifier assigned to a network interface for communications and is typically represented in a hexadecimal format where each hexadecimal byte represents four binary digits (bits).

The first three bytes of the MAC address 216 define an organizationally unique identifier 216a (OUI) and the last three bytes define an organization-specified extension identifier (OSEI) 216b. Manufacturers universally administer a uniquely assigned address (sometimes called a burned-in address) to a network device. The first three octets (in transmission order) identify the organization that issued the identifier, which is known as the organizationally unique identifier 216a (OUI).

Referring to FIGS. 2C and 2D a 48 bit MAC address 216 can be converted to a 64 bit EUI-64 source address 210 by separating the first three bytes (the OUI 216a) and the last three bytes (the OSEI 216b) and inserting two octets (e.g., FE-FE) therebetween. In other words, to convert a MAC-48 address into an EUI-64 address, copy the OUI 216a, append two octets FE-FE, and then copy the organization-specified extension identifier 216b. To convert an EA-48 into an EUI-64, execute the same process, but insert FE-FE as the inserted two octets. For example, a MAC address 216 having hexadecimal digits 00:12.7F.EB.6B.40 can be converted to a EUI-64 address having hexadecimal digits 02:12.7F.FF.FE.EB.6B.40. This 64 bit quantity can be used as a host interface identifier 214. Similarly, a 48 bit MAC address 216 can be derived from a 64 bit host interface identifier 214 by concatenating the first and last three bytes (the OUI 216a and the OSEI 216b) of the hexadecimal address of the host interface identifier 214. The universal/local [U/L] bit can be toggled, as shown in FIG. 2D, to indicate whether the address is universally or locally administered.

Referring to FIG. 1, in some implementations, the security system 100 includes an extractor 110 and a comparer 120. When the service provider 20 receives a data packet 200 from a client 30, the security system 100 determines an authenticity of the client 30 (e.g., validates that the received data packet 200 originated from an authorized client). The extractor 110 receives the data packet 200 and extracts an Internet protocol (IP) source address 210 (e.g., an IPV6 address) of the client 30. In some examples, another module communicates the IP source address 210 to the extractor 110. The extractor 110 extracts a media access control (MAC) address 216 from the IP source address 210. In some examples, the extractor 110 identifies the host interface identifier 214 of the IP source address and concatenates the first and last three bytes (the OUI 216a and the OSEI 216b) of the hexadecimal address of the host interface identifier 214 to obtain the MAC address 216.

The comparer 120 compares the extracted MAC address 216 with at least one client MAC address 216 associated with the client 30. The security system 100 may store the client associated MAC addresses 216 in a data store 50 (e.g., storage device, local and/or remote memory, cloud storage, etc.). Based on the comparison, the comparer 120 signals execution of one or more client authentication challenges when the extracted MAC 216 fails to match the at least one MAC address 216 associated with the client 30. An authentication challenger 130 may receive the signals sent by the comparer 120 and execute multiple client authentication challenges, such as prompts for questions, passwords, keys, etc.

In some implementations, the security system 100 may include an attributer 140 that associates the extracted MAC address 216 with the client 30 after successful execution of the one or more client authentication challenges. Each associated MAC address may receive an age attribute having a time T of zero when initially associated. The attributer 140 may disassociate a MAC address 216 from the client 30 after a threshold period of time $T_{max}$, for example, an age T>3 weeks. Other threshold time periods are possible as well, such as 3 days, 3 months, 3 years, etc. Moreover, in some examples, the comparer 120 checks the ages of the client associated MAC addresses 216 when comparing the associated MAC addresses 216 with the extracted MAC address 216. If some or all of the associated MAC addresses 216 have an age within a threshold range of an expiration age, the comparer 120 may signal the authentication challenger 130 to execute multiple client authentication challenges.

Referring to FIG. 3, in some implementations, the extractor 110 extracts an organizationally unique identifier (OUI) 216a from the MAC address 216 of the received IP source address 210 and may determine a source identifier 310 therefrom, such as an entity identity, a source device type, and/or a source device unique identifier. In some examples, the extractor 110 communicates with one or more data stores 50 (e.g., database, lookup table(s), data object, etc.) to determine the entity identity (e.g., name and/or contact information), the source device type (e.g., manufacturer, device model, etc.) and/or the source device unique identifier (e.g., serial number or unique identifier). For example, for a MAC address 216 of 10:9a:dd:b4:57:c9, the OUT 216a is 10:9a:dd and the OSEI 216b is b4:57:c9. Based on the OUT 216a, the extractor 110 may determine a manufacture (e.g., Apple®) and a device type (e.g., MacBook Pro) of the client 30 (e.g., by querying a database). Moreover, the OSEI 216b of b4:57:c9 provides the source device unique identifier.

The comparer 120 may compare the determined source identifier 310 with at least one source identifier 310 associated with the client 30 and signal execution of one or more client authentication challenges when the determined source identifier 310 fails to match the at least one source identifier 310 associated with the client 30. For example, if the received data packet 200 originated from a Dell® computer versus an Apple® MacBookPro, which was previously stored as a source identifier 310 of the client 30, the comparer 120 may signal to the authentication challenger 130 to execute additional client authentication challenges to authenticate the new client device.

The attributer 140 may associate the source identifier 310 with the client 30 after successful execution of the one or more client authentication challenges. Moreover, as with the MAC address 216, the attributer 140 may disassociate a source identifier 310 from the client 30 after a threshold period of time $T_{max}$.

In some implementations, the extractor 110 determines a source device type and a source software application type from the MAC address 216. The comparer 120 may compare a compatibility between the determined source device type and the determined source software application type and signal the authentication challenger 130 to execute one or more client authentication challenges when the determined source device type is incompatible with the determined source software application type. For example, if the software application type is a mobile device application that does not run on a desktop computer, yet the extractor 110 can determine from the MAC address 216 that the data packet 200 originated from a desktop computer, the comparer 120 may signal to challenge the authenticity of the client 30.

Figure 4:
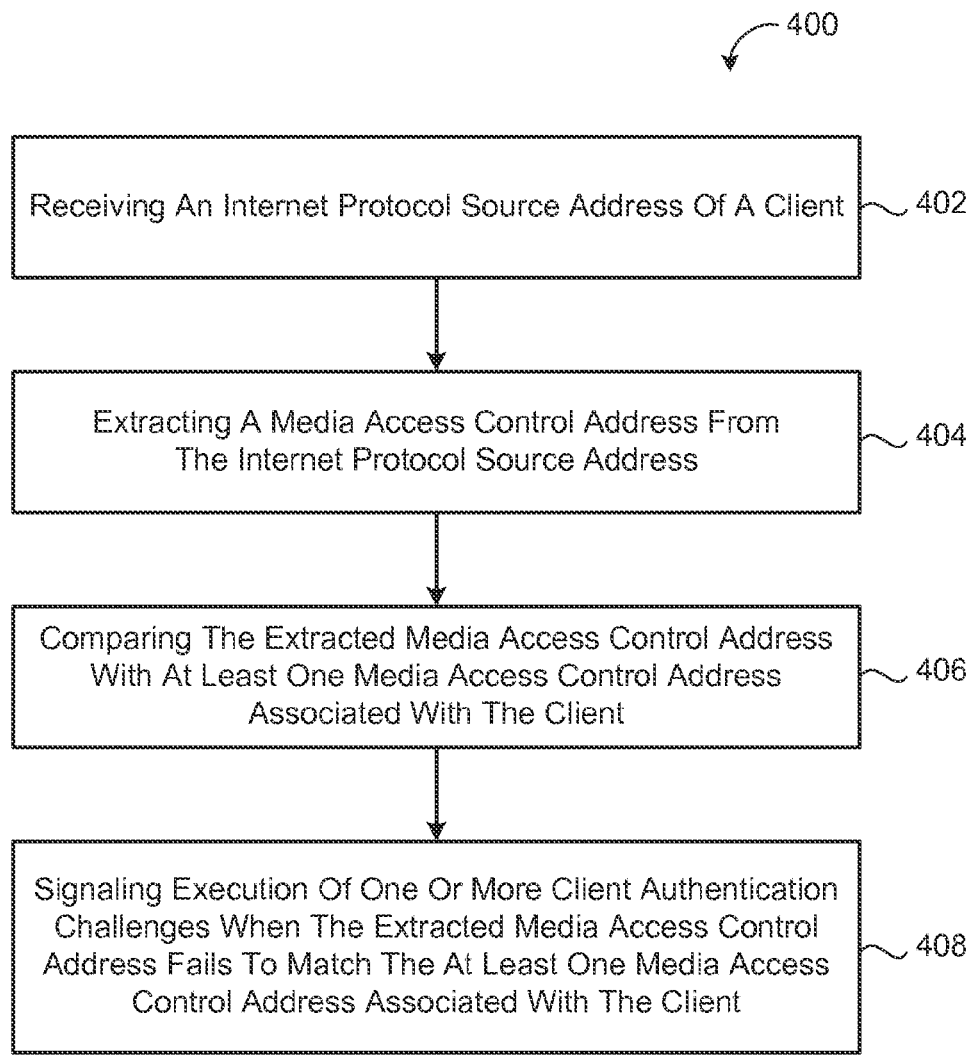
FIG. 4 provides an exemplary arrangement of operations for a method of client authentication.

FIG. 4 provides an exemplary arrangement 400 of operations for a method of client authentication. The method includes receiving 402 an Internet protocol (IP) source address 210 (e.g., an IPv6 address) of a client 30, extracting 404 a media access control (MAC) address 216 from the IP source address 210, comparing 406 the extracted MAC address 216 with at least one MAC address 216 associated with the client 30, and signaling 408 execution of one or more client authentication challenges when the extracted MAC address 216 fails to match the at least one MAC address 216 associated with the client 30.

In some implementations, the method includes extracting an interface identifier 214 from the IP source address 210 and extracting the MAC address 216 from the interface identifier 214. The method may include associating the extracted MAC address 216 with the client 30 after successful execution of the one or more client authentication challenges. Moreover, an age T can be attributed to the extracted MAC address 216, such that the method may include disassociating the MAC address 216 from the client 30 after a threshold period of time $T_{max}$ (e.g., an age of 2-6 months).

In some implementations, the method includes extracting an organizationally unique identifier (OUI) 216a from the MAC address 216. A source identifier 310 can be determined from the OUI 216a, such as an entity identity, a source device type, and a source device unique identifier. The method may include comparing the determined source identifier 310 with at least one source identifier 310 associated with the client 30 and signaling execution of one or more client authentication challenges when the determined source identifier 310 fails to match the at least one source identifier 310 associated with the client 30. The method may include associating the determined source identifier 310 with the client 30 after successful execution of the one or more client authentication challenges. Moreover, the determined source identifier 310 can be disassociated from the client 30 after a threshold period of time $T_{max}$.

The method, in some implementations, includes determining a source device type and a source software application type from the MAC address 216 and then comparing a compatibility between the determined source device type and the determined source software application type. The method may include signaling execution of one or more client authentication challenges when the determined source device type is incompatible with the determined source software application type.

Figure 5:
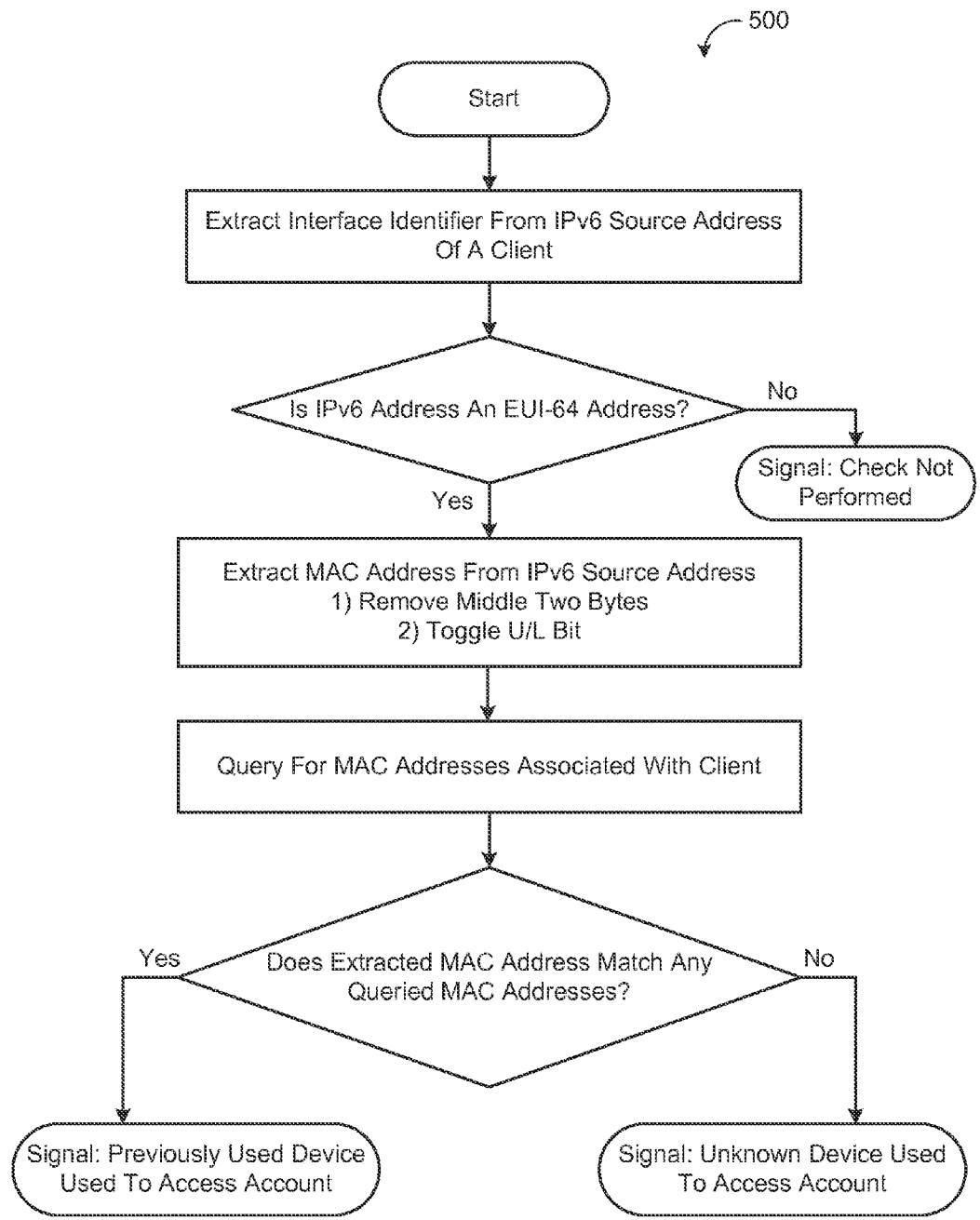
FIG. 5 provides a schematic view of an exemplary flow chart for authenticating a client.

FIG. 5 provides a schematic view of an exemplary flow chart 500 of operations for authenticating a client 30. In some implementations, the operations include extracting a host interface identifier 214 from a received IPv6 source address 210. If the IPv6 source address 210 is not an EUI-64 address, then signal (e.g., to the authentication challenger 130) that the check cannot be completed. Otherwise, the operations include extracting a MAC address 216 from the IPv6 source address 210. In some examples, the operations include removing the middle two bytes from the IPv6 source address 210 and toggling the u/l bit (see e.g., FIGS. 2C and 2D), resulting in the MAC address 216. The operations further include querying for MAC addresses 216 associated with the client 30 (e.g., querying the data source 50). If the extracted MAC address 216 matches a queried MAC address 216, the operations include signaling that the client 30 is using a previously authenticated device, which may result in no further client authentication challenges. Otherwise, the operations include signaling that the client 30 is using an unknown device, which may result in further client authentication challenges to make sure that an attacker is not using packet header forgery.

Activity tracking based on IP address is a potential privacy issue for IP-enabled devices. As a result, the service provider 20 may allow clients 30 to opt out. For example, a client 30 may set a profile option that disables device activity tracking.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one pro iv processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a client, one or more aspects of the disclosure can be implemented on a computer having a display device, e.g., a CRT (cathode ray tube), LCD (liquid crystal display) monitor, or touch screen for displaying information to the client and optionally a keyboard and a pointing device, e.g., a mouse or a trackball, by which the client can provide input to the computer. Other kinds of devices can be used to provide interaction with a client as well; for example, feedback provided to the client can be any form of sensory feedback, e.g., visual feedback, auditory feedback, or tactile feedback; and input from the client can be received in any form, including acoustic, speech, or tactile input. In addition, a computer can interact with a client by sending documents to and receiving documents from a device that is used by the client; for example, by sending web pages to a web browser on a client's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical client interface or a Web browser through which a client can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving client input from a client interacting with the client device). Data generated at the client device e.g., a result of the client interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of client authentication, the method comprising:
   receiving, at a computing device, an Internet protocol source address of a client;
   extracting, at the computing device, a media access control address from the Internet protocol source address;
   comparing, at the computing device, the extracted media access control address with at least one client media access control address associated with the client;
   signaling execution, at the computing device, of one or more client authentication challenges when the extracted media access control address fails to match the at least one client media access control address associated with the client;
   associating, at the computing device, the extracted media access control address with the client after successful execution of the one or more client authentication challenges;
   attributing, at the computing device, an age to the extracted media access control address; and
   disassociating, at the computing device, the extracted media access control address from the client after a threshold period of time.

2. The method of claim 1, further comprising:
   extracting, at the computing device, an interface identifier from the Internet protocol source address; and
   extracting, at the computing device, the media access control address from the interface identifier.

3. The method of claim 1, further comprising extracting, at the computing device, an organizationally unique identifier from the media access control address.

4. The method of claim 3, further comprising determining, at the computing device, a source identifier from the organizationally unique identifier, the source identifier comprising at least one of an entity identity, a source device type, or a source device unique identifier.

5. The method of claim 4, further comprising:
   comparing, at the computing device, the determined source identifier with at least one source identifier associated with the client; and
   signaling execution, at the computing device, of one or more client authentication challenges when the determined source identifier fails to match the at least one source identifier associated with the client.

6. The method of claim 5, further comprising associating, at the computing device, the determined source identifier with the client after successful execution of the one or more client authentication challenges.

7. A method of client authentication, the method comprising:
receiving, at a computing device, an Internet protocol source address of a client;
extracting, at the computing device, a media access control address from the Internet protocol source address;
comparing, at the computing device, the extracted media access control address with at least one client media access control address associated with the client;
extracting, at the computing device, an organizationally unique identifier from the media access control address;
determining, at the computing device, a source identifier from the organizationally unique identifier, the source identifier comprising at least one of an entity identity, a source device type, or a source device unique identifier;
comparing, at the computing device, the determined source identifier with at least one source identifier associated with the client;
signaling execution, at the computing device, of one or more client authentication challenges when:
the extracted media access control address fails to match the at least one client media access control address associated with the client; or
the determined source identifier fails to match the at least one source identifier associated with the client;
associating, at the computing device, the determined source identifier with the client after successful execution of the one or more client authentication challenges;
attributing, at the computing device, an age to the determined source identifier; and
disassociating, at the computing device the determined source identifier from the client after a threshold period of time.

8. The method of claim 1, further comprising:
determining, at the computing device a source device type from the media access control address;
determining, at the computing device, a source software application type from the media access control address;
comparing, at the computing device a compatibility between the determined source device type and the determined source software application type; and
signaling execution, at the computing device, of one or more client authentication challenges when the determined source device type is incompatible with the determined source software application type.

9. A security system comprising:
a data processor executing:
an extractor receiving an Internet protocol source address of a client and extracting a media access control address from the Internet protocol source address;
a comparer comparing the extracted media access control address with at least one client media access control address associated with the client and signaling execution of one or more client authentication challenges when the extracted media access control address fails to match the at least one client media access control address associated with the client; and
an attributer associating the extracted media access control address with the client after successful execution of the one or more client authentication challenges, the attributer disassociating the extracted media access control address from the client after a threshold period of time.

10. The security system of claim 9, wherein the extractor extracts an interface identifier from the Internet protocol source address and extracting the media access control address from the interface identifier.

11. The security system of claim 9, wherein the extractor extracts an organizationally unique identifier from the media access control address.

12. The security system of claim 11, wherein the extractor determines a source identifier from the organizationally unique identifier, the source identifier comprising at least one of an entity identity, a source device type, or a source device unique identifier.

13. The security system of claim 12, wherein the comparer:
compares the determined source identifier with at least one source identifier associated with the client; and
signals execution of one or more client authentication challenges when the determined source identifier fails to match the at least one source identifier associated with the client.

14. The security system of claim 13, wherein the attributer associates the determined source identifier with the client after successful execution of the one or more client authentication challenges.

15. A security system comprising:
a data processor executing:
an extractor configured to:
receive an Internet protocol source address of a client and extract a media access control address from the Internet protocol source address; and
extract an organizationally unique identifier from the media access control address and determine a source identifier from the organizationally unique identifier, the source identifier comprising at least one of an entity identity, a source device type, or a source device unique identifier;
a comparer configured to:
compare the extracted media access control address with at least one client media access control address associated with the client;
compare the determined source identifier with at least one source identifier associated with the client; and
signal execution of one or more client authentication challenges when:
the extracted media access control address fails to match the at least one client media access control address associated with the client; or
the determined source identifier fails to match the at least one source identifier associated with the client; and
an attributer configured to:
associate the determined source identifier with the client after successful execution of the one or more client authentication challenges; and
disassociate the determined source identifier from the client after a threshold period of time.

16. The security system of claim 9, wherein the extractor determines a source device type and a source software application type from the media access control address; and
wherein the comparer compares a compatibility between the determined source device type and the determined source software application type and signals execution of one or more client authentication challenges when the determined source device type is incompatible with the determined source software application type.

17. A computer program product encoded on a non-transitory computer readable storage medium comprising instructions that when executed by a data processing apparatus cause the data processing apparatus to perform operations comprising:
   receiving an Internet protocol source address of a client;
   extracting a media access control address from the Internet protocol source address;
   comparing the extracted media access control address with at least one client media access control address associated with the client;
   signaling execution of one or more client authentication challenges when the extracted media access control address fails to match the at least one client media access control address associated with the client;
   associating the extracted media access control address with the client after successful execution of the one or more client authentication challenges;
   attributing an age to the extracted media access control address; and
   disassociating the extracted media access control address from the client after a threshold period of time.

18. The computer program product of claim 17, wherein the performed operations further comprise:
   extracting an interface identifier from the Internet protocol source address; and
   extracting a media access control address from the interface identifier.

19. The computer program product of claim 17, wherein the performed operations further comprise extracting an organizationally unique identifier from the media access control address.

20. The computer program product of claim 19, wherein the performed operations further comprise determining a source identifier from the organizationally unique identifier, the source identifier comprising at least one of an entity identity, a source device type, or a source device unique identifier.

21. The computer program product of claim 20, wherein the performed operations further comprise:
   comparing the determined source identifier with at least one source identifier associated with the client; and
   signaling execution of one or more client authentication challenges when the determined source identifier fails to match the at least one source identifier associated with the client.

22. The computer program product of claim 21, wherein the performed operations further comprise associating the determined source identifier with the client after successful execution of the one or more client authentication challenges.

23. A computer program product encoded on a non-transitory computer readable storage medium comprising instructions that when executed by a data processing apparatus cause the data processing apparatus to perform operations comprising:
   receiving an Internet protocol source address of a client;
   extracting a media access control address from the Internet protocol source address;
   comparing the extracted media access control address with at least one client media access control address associated with the client;
   extracting an organizationally unique identifier from the media access control address;
   determining a source identifier from the organizationally unique identifier, the source identifier comprising at least one of an entity identity, a source device type, or a source device unique identifier;
   comparing the determined source identifier with at least one source identifier associated with the client;
   signaling execution of one or more client authentication challenges when:
      the extracted media access control address fails to match the at least one client media access control address associated with the client; or
      the determined source identifier fails to match the at least one source identifier associated with the client;
   associating the determined source identifier with the client after successful execution of the one or more client authentication challenges; and
   disassociating the determined source identifier from the client after a threshold period of time.

24. The computer program product of claim 17, wherein the performed operations further comprise:
   determining a source device type from the media access control address;
   determining a source software application type from the media access control address;
   comparing a compatibility between the determined source device type and the determined source software application type; and
   signaling execution of one or more client authentication challenges when the determined source device type is incompatible with the determined source software application type.

* * * * *